United States Patent [19]
Van Camp

[11] Patent Number: 6,004,070
[45] Date of Patent: Dec. 21, 1999

[54] WASTE STORAGE CONTAINMENT CELL, METHOD OF OPERATING, AND APPARATUS THEREFORE

[76] Inventor: John W. Van Camp, 50 N. Walnut, Mt. Clemens, Mich. 48043-5620

[21] Appl. No.: 08/889,864

[22] Filed: Jul. 8, 1997

Related U.S. Application Data

[60] Provisional application No. 60/021,290, Jul. 8, 1996.

[51] Int. Cl.⁶ .......................................... B09B 1/00
[52] U.S. Cl. ........................... 405/129; 588/259; 588/260
[58] Field of Search .................................. 405/128, 129, 405/270; 588/259, 260; 210/901

[56] References Cited

U.S. PATENT DOCUMENTS

| | | |
|---|---|---|
| 3,604,179 | 9/1971 | Lund . |
| 3,729,107 | 4/1973 | Present . |
| 3,801,358 | 4/1974 | Steinberg et al. . |
| 4,234,632 | 11/1980 | Lubowitz . |
| 4,303,412 | 12/1981 | Baikoff . |
| 4,362,434 | 12/1982 | Valiga et al. ............................. 405/128 |
| 4,430,021 | 2/1984 | Wagner et al. ......................... 588/259 |
| 4,650,086 | 3/1987 | Morrison, Jr. ......................... 220/606 |
| 4,681,788 | 7/1987 | Barito et al. . |
| 4,696,599 | 9/1987 | Rakoczynski et al. ................. 405/129 |
| 4,771,951 | 9/1988 | Kiehn . |
| 4,810,131 | 3/1989 | Turner ..................................... 405/129 |
| 4,844,840 | 7/1989 | Feizollahi ........................... 405/129 X |
| 4,919,569 | 4/1990 | Wittenzelliner ........................ 405/128 |
| 4,950,105 | 8/1990 | Meess et al. ....................... 405/129 X |
| 5,035,537 | 7/1991 | Rose ....................................... 405/128 |
| 5,078,543 | 1/1992 | Terrel ..................................... 405/128 |
| 5,079,091 | 1/1992 | Takahashi et al. . |
| 5,092,709 | 3/1992 | Davis ..................................... 405/129 |
| 5,120,161 | 6/1992 | Faussone ............................... 405/129 |
| 5,190,406 | 3/1993 | Shannonhouse et al. ............. 405/129 |
| 5,196,620 | 3/1993 | Gustin et al. ........................... 588/257 |
| 5,201,609 | 4/1993 | Johnson ................................. 405/129 |
| 5,215,409 | 6/1993 | Jax et al. ............................... 405/129 |
| 5,272,910 | 12/1993 | Everett et al. ..................... 588/260 X |
| 5,275,508 | 1/1994 | Hansen .................................. 405/129 |
| 5,276,252 | 1/1994 | Biros et al. ............................ 588/249 |
| 5,288,168 | 2/1994 | Spencer ............................ 405/129 X |
| 5,362,182 | 11/1994 | Hergenrother ........................ 405/129 |
| 5,421,671 | 6/1995 | Lewis ................................ 405/128 X |
| 5,599,139 | 2/1997 | Chewning et al. .................... 405/129 |
| 5,716,165 | 2/1998 | Burgert ................................. 405/129 |

*Primary Examiner*—George Suchfield
*Attorney, Agent, or Firm*—Lynn E. Cargill

[57] ABSTRACT

A new covered landfill or remediated waste containment cell having an excavated bottom surface, lined with a watertight liner and a leak detection system for determining whether or not leakage has occurred, either from the top, or from the bottom. The cover over the landfill containment cell substantially prevents rainwater from coming in the top, and the liner stops water from erupting up from the bottom. This containment cell allows a method of storing waste in an essentially non-contaminating manner, thereby providing an environmentally sound procedure and apparatus for storing toxic wastes. This containment cell is particularly suitable for remediating old leaking landfill sites within a short distance of the old site.

15 Claims, 11 Drawing Sheets

WASTE STORAGE CONTAINMENT CELL, METHOD OF OPERATING, AND APPARATUS THEREFORE

This application claims the benefit of U.S. Provisional Application Ser. No. 60/021,290, filed on Jul. 8, 1996.

TECHNICAL FIELD

This invention relates generally to a method and apparatus for leak proof storage of landfilled materials and other wastes, and more particularly is directed toward a waste storage containment cell for use on an approved landfill site.

BACKGROUND OF THE INVENTION

In the past, storage of waste including garbage and other materials in landfills has created problems. As rain falls on the top of the piled-up garbage and other materials, those materials become wet and create leachate from the rain water and the materials which have been "leached" out of the garbage. This leachate generally contains many of the undesirable toxic materials that were contained in the waste. Old landfills were placed into gravel pits or other open areas that were already excavated into the earth. These gravel pits were especially undesirable because the water from the rain falling down carried toxic materials from the landfill materials, reaching and contaminating the aquafer line underneath the gravel bed. The toxic materials that are carried into the aquafer from the landfill garbage have created huge environmental problems in our water table, sometimes requiring remediation.

As many of the landfill sites have been placed next to riverbeds throughout the entire United States, the leachate which is produced from the rain in combination with the landfill materials has flown into the rivers, which are the water intake sources for many of America's largest cities.

Modern day landfills have been placed on non-porous clay beds lined with heavy non-porous liner materials in order to alleviate the problems of leachate draining directly into our waterways. However, as the earth shifts, these clay beds experience fissures and other forms of cracks therein. Consequently, although the modern day landfills are not nearly as offensive as the old-time gravel pit bed landfills, they are nevertheless still very dangerous to the environment. Some of the dangers which become a problem include noxious fumes and odors, scavenger birds, and rodents, all of which have the potential to cause various health hazards.

Therefore, it would be of great advantage to the environment to create an odor free, water tight, leak proof, waste storage containment cell for storing our waste in an environmentally correct storage situation.

Furthermore, it would be of great advantage to provide such a storage containment system which will allow us to try and identify the stored materials in their respective discrete containers in case those materials may have a use for some industry in the future. The containment storage units would be advantageously located so that they may be retrieved at a later date.

SUMMARY OF THE INVENTION

In accordance with the present invention, my invention includes a substantially odor free, water tight, leak proof, waste storage containment cell to replace conventional landfill sites. My containment cell will also require, much like the modern day landfills, a non-porous clay bed which will be excavated and lined for holding the containers of dried waste.

Upon excavation of a site, a leak proof liner will be installed on the top, floor and sides of the excavation, such as a double liner system. This liner will also contain a leak monitoring system to determine if a leak has occurred allowing water to enter the containment cell from underneath. The liner material is well known in the art, and may be especially purchased from Gundle Lining Systems, Inc. of Houston, Texas. After the cell has been filled, a similar liner material complete with a leak detection system will be placed to "cap" the well. This is generally covered with dirt and grass, ready for any suitable purpose.

On top of the waste storage containment cell, while the cell is being filled in accordance with my invention, will be placed a roof, preferably an air structure, or air dome, in order to prevent rain or other forms of moisture from approaching the storage containers from the top. In the air structure embodiment, the air structure will be attached by footings around the perimeter of the cell, and over the top of the storage containers during the filing period. The air structure is my preferred embodiment because it does not require any posts or support beams in the middle of the structure, thereby allowing free movement of trucks and equipment without the hindrance of such posts or support beams. After the containment cell is full, the landfill will be capped before the air structure is taken down when all of the storage containers are in place. As stated, the cell is capped and then the air structure will be taken down, before landscaping or any other topical treatment, including any suitable post-filled purpose that can be used on top of the entire containment cell.

The waste materials will be processed and placed into individual containers which are carefully stacked inside the lined clay excavation and covered with an air structure. This system will assure that water can neither get into the filled storage containers from the top, nor from the bottom because both the top and the bottom will have leak monitoring detectors to determine if water is coming in from the top or the floor.

Therefore, in accordance with the present invention, my waste storage containment cell will solve the problems heretofore mentioned, and will provide a secure, leak proof, substantially odor free, containment cell for storing waste in individual containers.

DETAILED DESCRIPTION OF THE INVENTION

Figure 1:
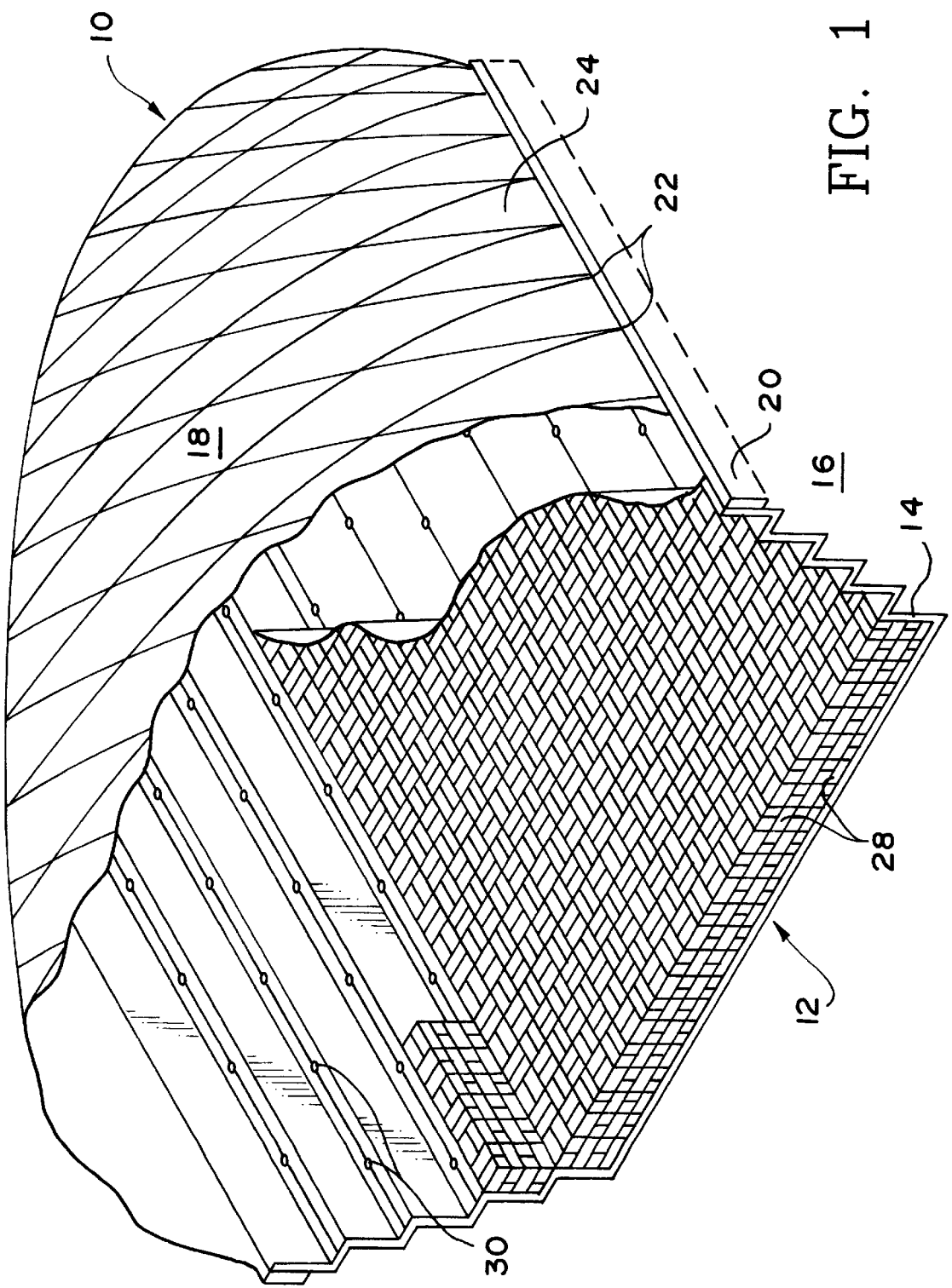
FIG. 1 is a perspective view of the waste storage containment cell in accordance with this invention.

Referring first to FIG. 1 of the drawings, numeral 10 generally denotes the structure of this invention which is formed of a step-sided bottom surface, such as clay excavation 12, lined with a liner 14 embedded into the earth 16. The cover is shown as air structure 18, which is secured about its perimeter to footings 20 by tiedowns 22. Air structure 18 is of a preferred design and includes fabric 24, generally made of Tedlar-clad polyester vinyl, available from Asati Corporation of Tappan, New York, or other materials which are well known in the industry. Bias cables 26 secure fabric 24 so that they do not shift due to wind pressure. Containers 28, which hold the processed waste are placed within excavation 12 and the liner 14 is monitored for leaks by sensors 30. As one can see in FIG. 1, there is a water-proof system defined by the bottom liner, the containers contained therein, and the air structure 18 which covers the entire assembly.

Figure 2:
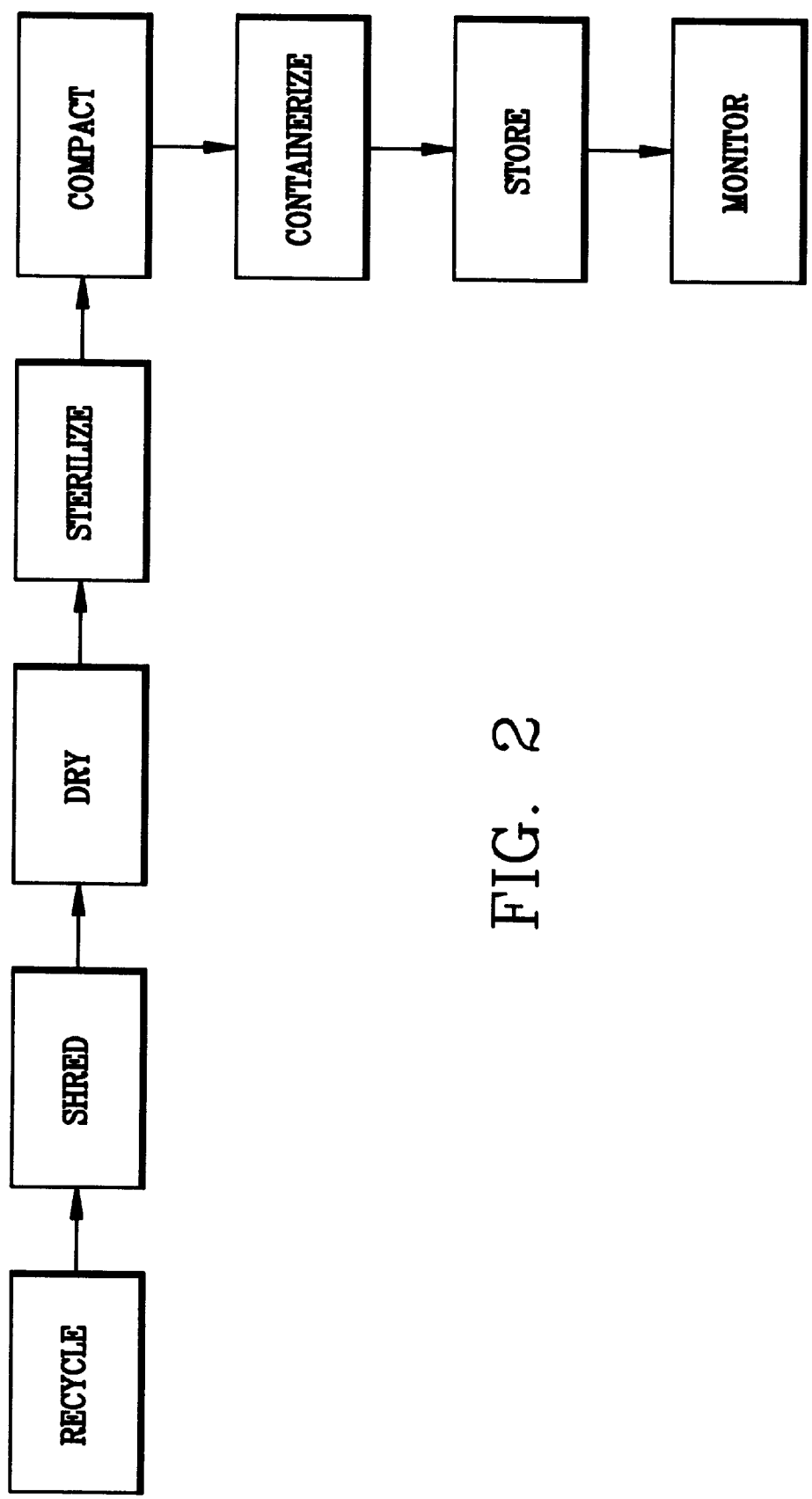
FIG. 2 is a schematic of the full method employed in pursuance of my invention, including all the possible optional steps.

Referring now to FIG. 2, there is shown schematically the fully possible method in accordance with the present invention, including most of the optional steps. Once the garbage, waste or landfill materials have been received at the landfill site, the first step includes recycling all of the possible materials that can be recycled. Traditionally, this step has been called a materials recovery facility, which means that all recyclable materials are separated, generally by hand, or magnetically. Metals which can be recycled are stored in separate containers, recyclable plastics will be stored in separate containers, while other recyclable materials, including paper, batteries, construction materials, etc. will be separated to be placed into separate containers in case they can be recycled later. These individual containers with separated materials therein are much more suitable for future recycling efforts. For instance, of late, the recycling efforts for newsprint has been so successful that we have been landfilling the excess of newsprint. In my invention, all the newsprint would be put into separate newsprint containers and stored. At a later date, when newsprint may be desired, the containers can be located and retrieved for further recycling.

Materials to be stored will help to determine the selection of the individual containers. For example, waste capable of being stored is not only curbside garbage and construction waste. Liquids, medical waste, remedial waste, industrial, nuclear, and hazardous wastes can be properly stored as long as the individual containers are properly selected.

Still referring to FIG. 2, after the recyclable materials have been extracted, the remainder can be shredded, dried, possibly sterilized with ultraviolet light or some other known means, and then compacted with bailers. After compacting, bailers can make cubes of compacted materials which will generally be an exact fit within the containers and then stored. Thereafter, the leak monitors that are embedded into the floor of my waste storage containment cell are designed to continuously, or intermittently monitor, for an indefinite period of time, the water content on the floor of the containment cell.

Figure 3:
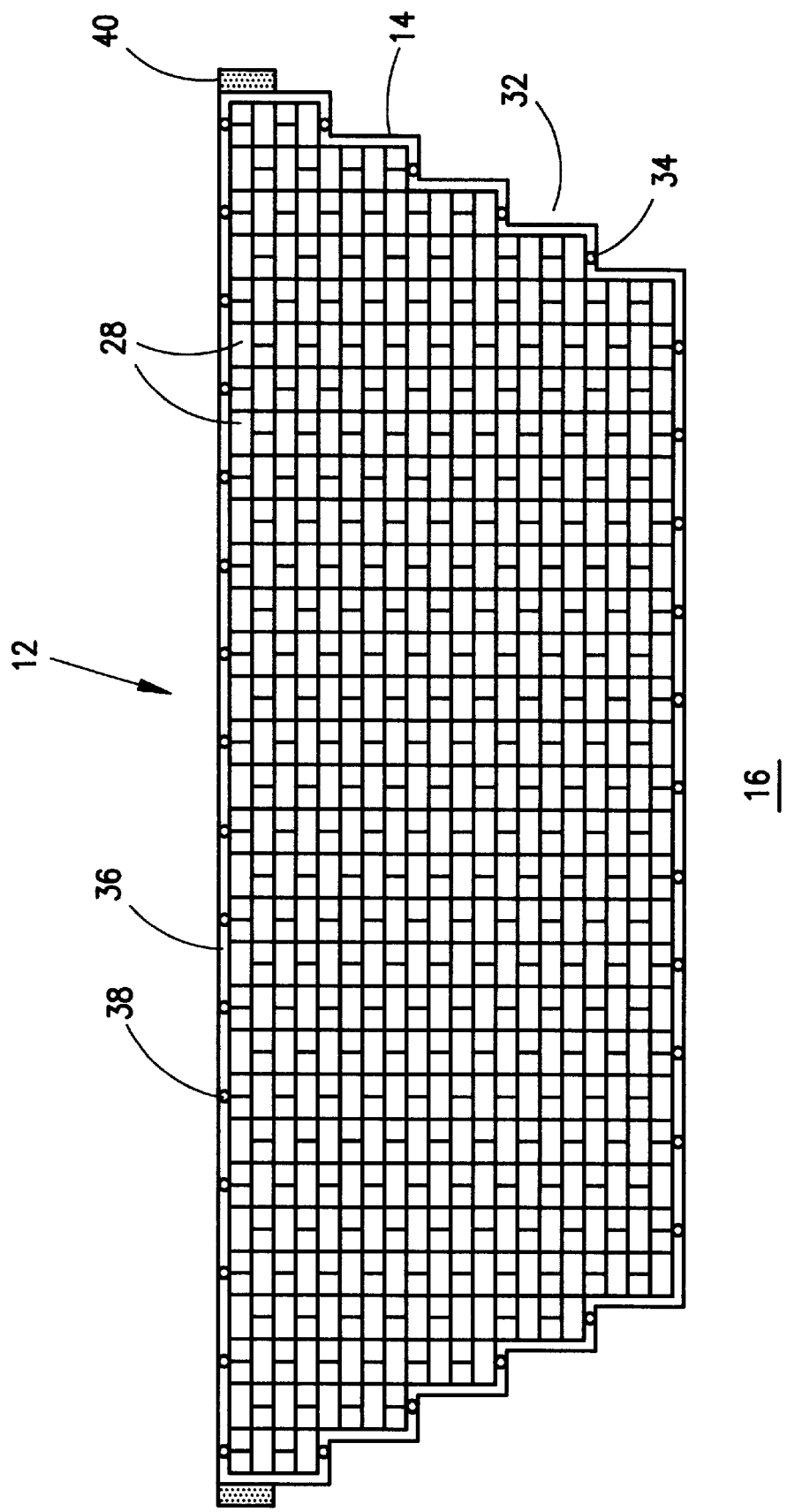
FIG. 3 is an end view of a typical, filled containment cell, showing individual containers as they are stacked.

Referring now to FIG. 3, the excavation which is generally denoted by 12, is shown with liner 14 in place. The clay under base 16, or the earth which underlies the clay is shown therein. Excavation 12 has stepped sides 32 having leak monitor conduit 34 contained on top of each step. The double lined cap 36 is placed on top of excavation 12 after all of the containers 28 have been put into place. Top monitor conduit 38 includes a sensor inside, which will be described more fully herein below. The support footings 40 are shown around the perimeter of the top of excavation 12 to which the air structure 18 is attached.

Figure 4:
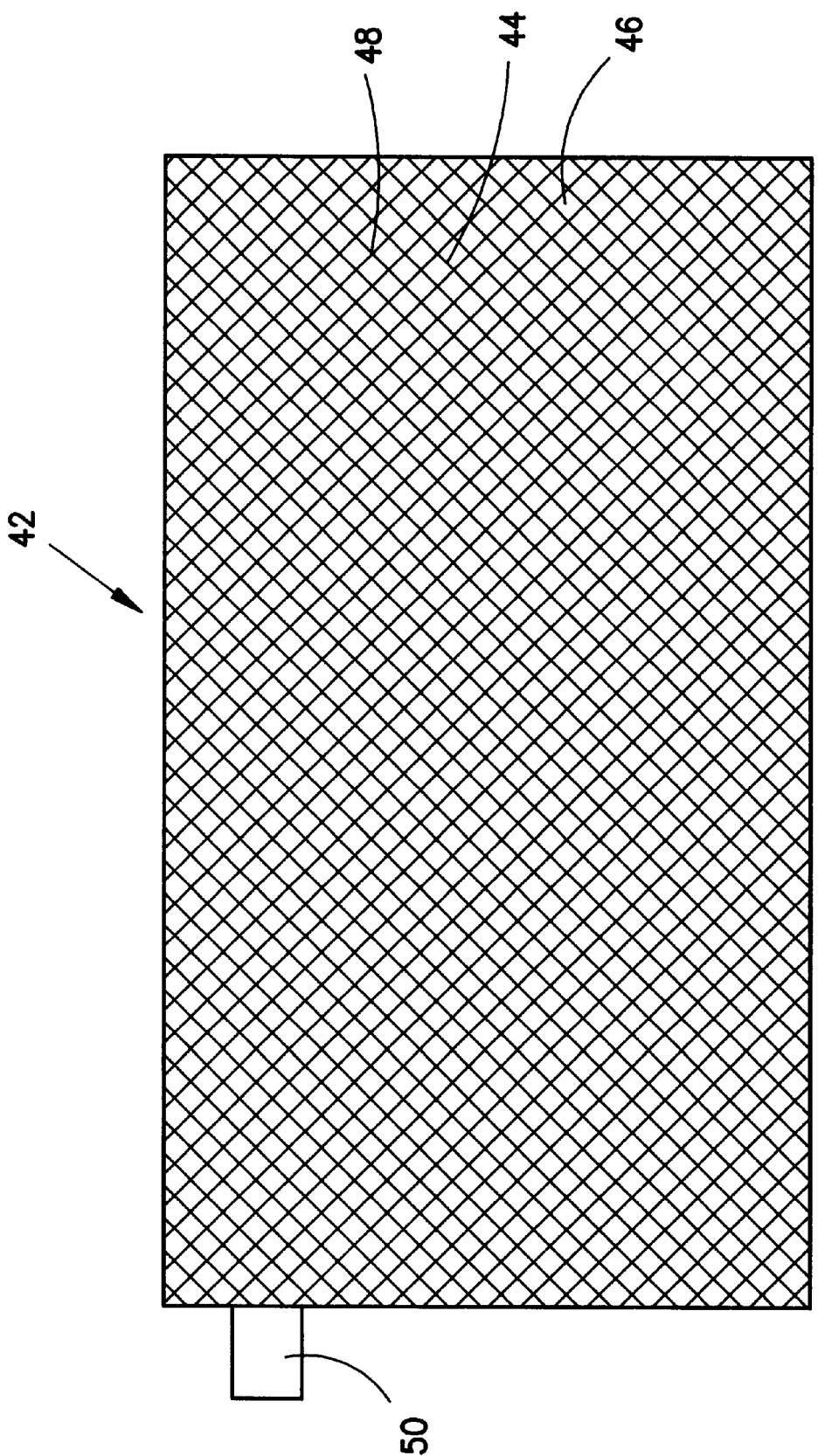
FIG. 4 is a top plan view of the air structure used to cover the site.

FIG. 4 is the top plan view of air structure 42 which includes bias cables 44, fabric 46 and cable cross ties 48. To enter into and exit out of air structure 42, there is an airlock entry 50. There may be more or one entries for each air structure. Needless to say, there are many variations of air structures. In my preferred embodiment, the A.S.A.T.I. air structure available from A.S.A.T.I. of Tappan, New York appears to be the best air structure for my application.

Figure 5:
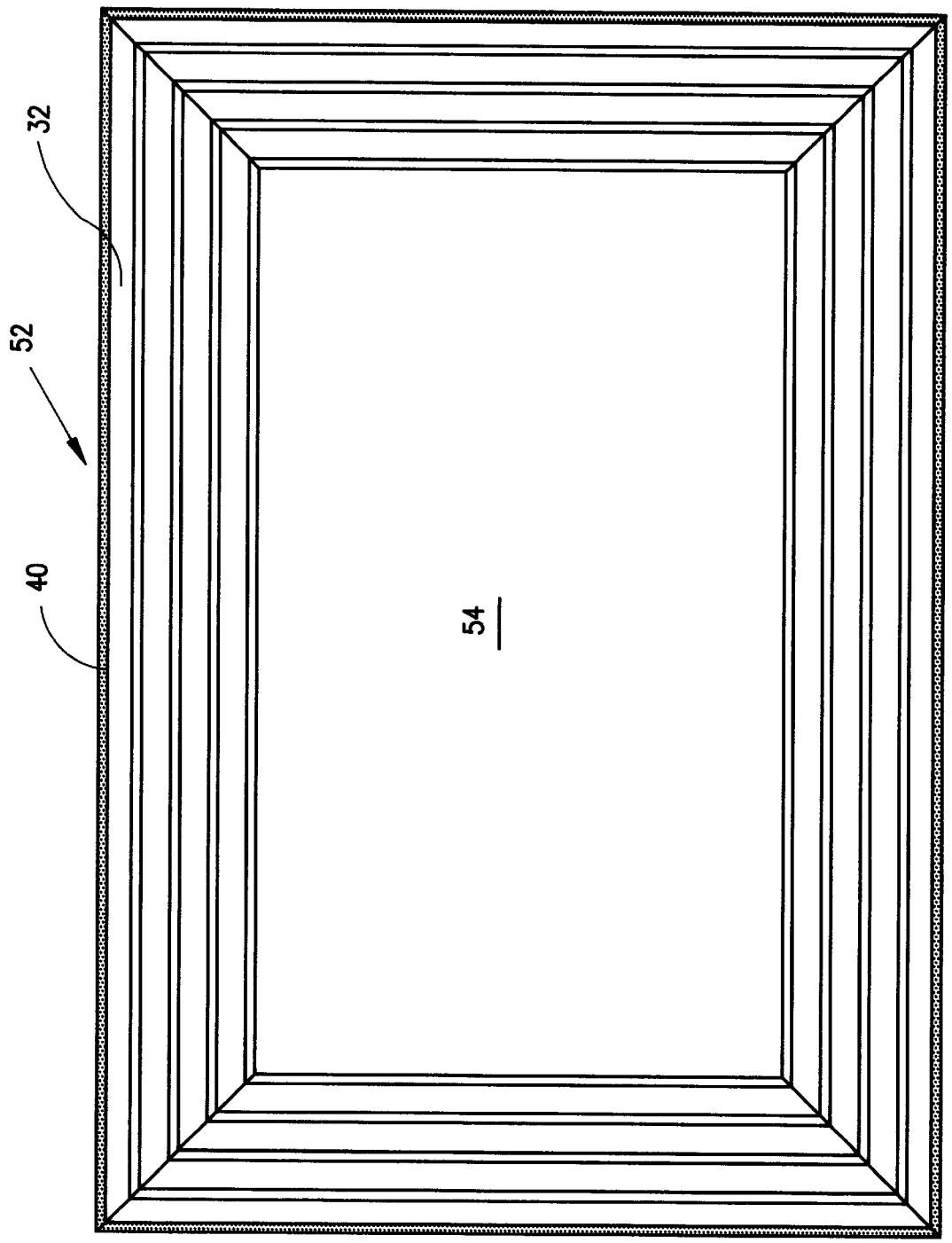
FIG. 5 is a top plan view of the excavated clay site showing the stepped configuration of the side walls.

FIG. 5 is the top plan view that is generally denoted by numeral 52. Stepped sides 32 have been carved out of the clay and are configured in a relatively perpendicular fashion to one and other in a more-or-less inverted pyramid effect which bites into the earth and such that the containers described further herein below, will be able to be successfully stacked one on top of the other in a crisscross or building block fashion to enhance stability. In the beginning, the containers will be stacked on floor 54 until the entire excavation is filled to the top. By way of illustration, support footings 40 are also illustrated.

Figure 6:
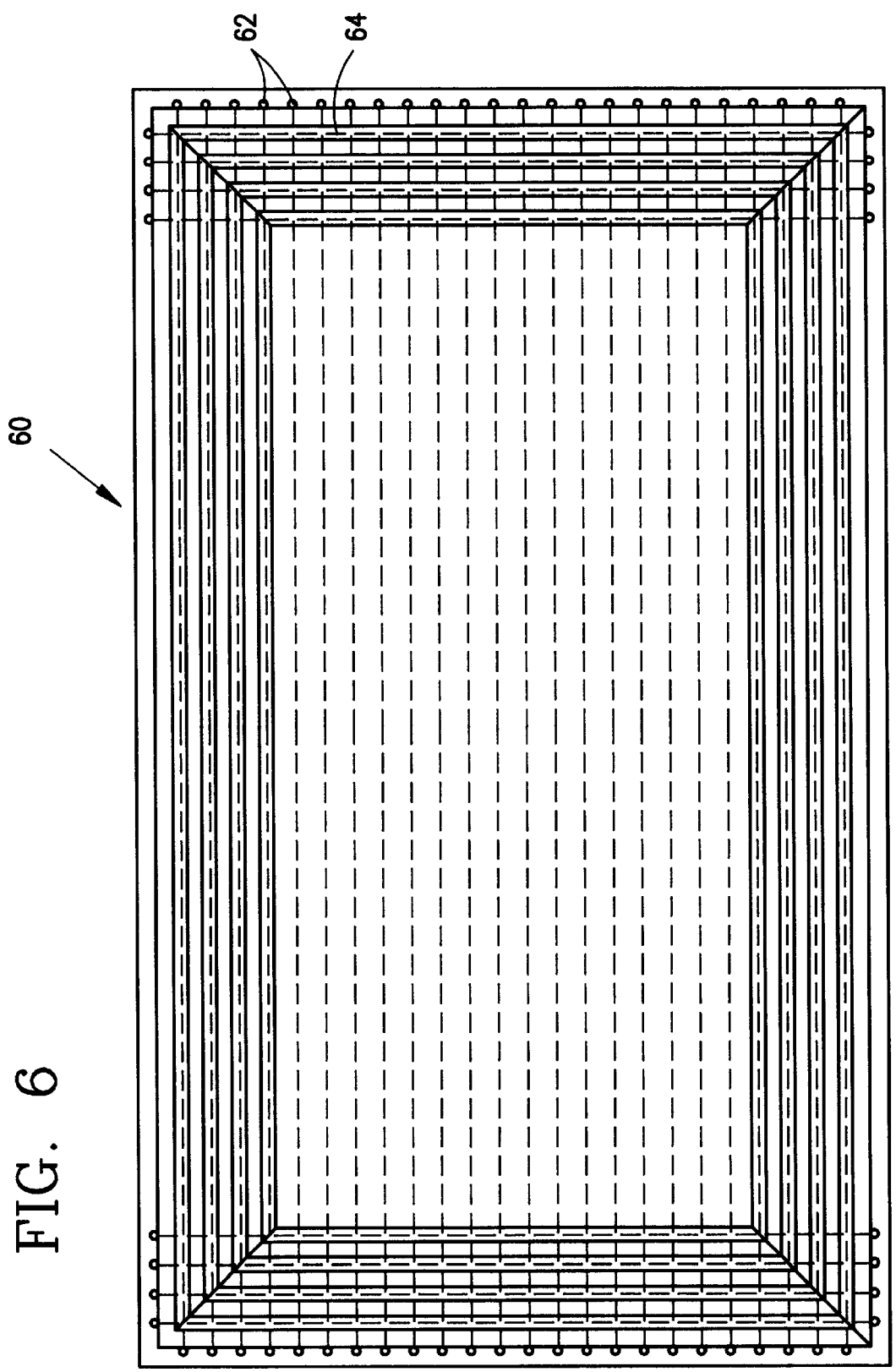
FIG. 6 is a top plan view of the excavated clay site showing the stepped side walls with the liner showing the phantom conduit paths for the leak monitoring centers and detection system.

Looking now to FIG. 6, the conduit grid of the present invention is generally denoted by numeral 60. Conduits 62 are shown in phantom as they stretch through the stepped side clay fixtures on the phantom conduit path 64. The conduits have been placed in such a fashion and manner such that if the sensor becomes faulty, there is a control system which relays that information back to a computer, not shown. The conduit path allows for identification, repair and maintenance of any faulty sensor which can be determined as time goes on.

Figure 7:
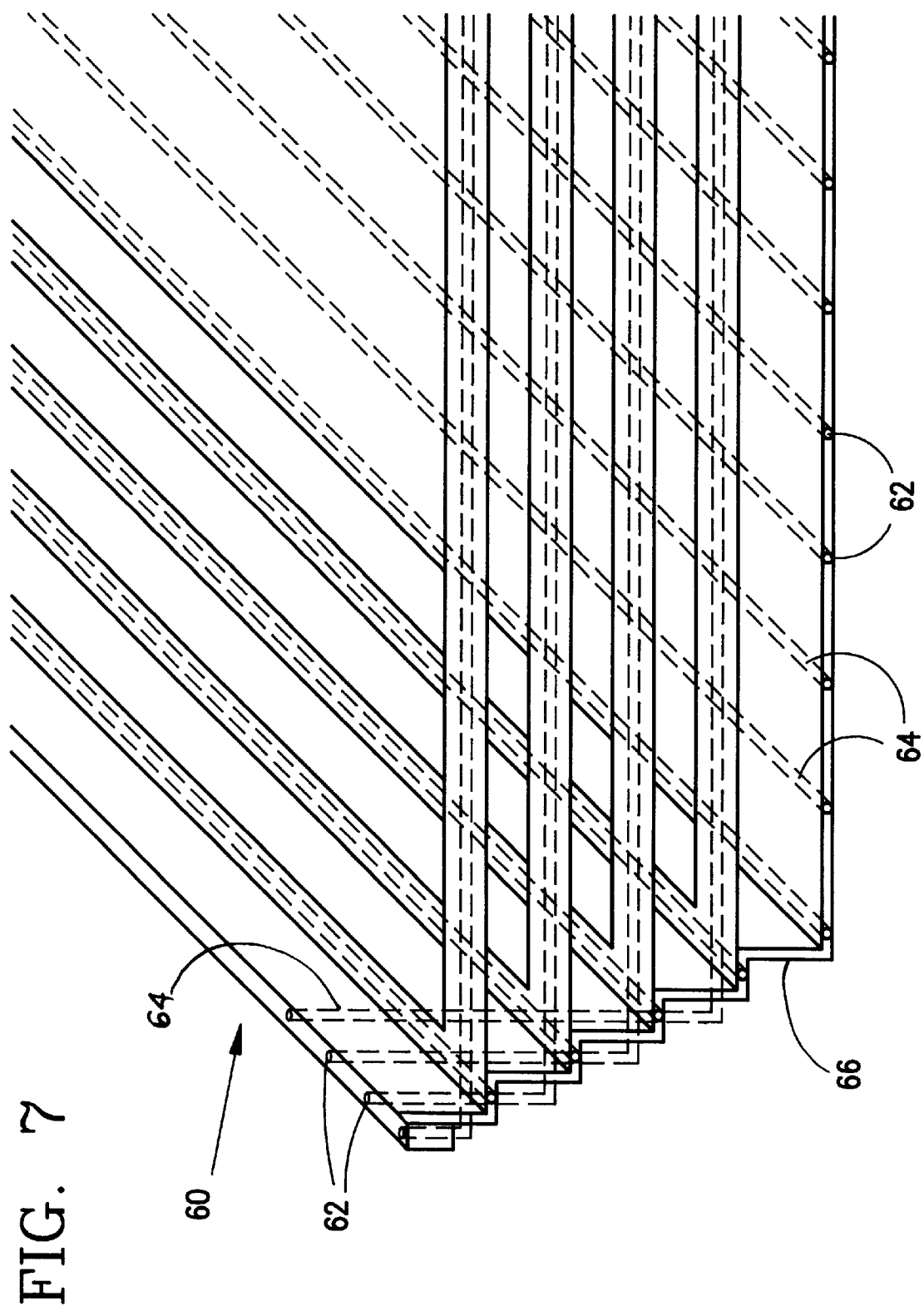
FIG. 7 is a perspective view showing, in phantom, the leak monitoring system including the conduit paths.

FIG. 7 is a perspective view of the preferred conduit layout showing overall conduit 60. One of ordinary skill in the art can easily recognize numerous configurations. Conduit 62 is shown as being placed within the phantom conduit path 64. Stepped sides 66 are shown to indicate the placement of the conduits for leak detection coming up from the bottom of the cell itself.

Figure 8:
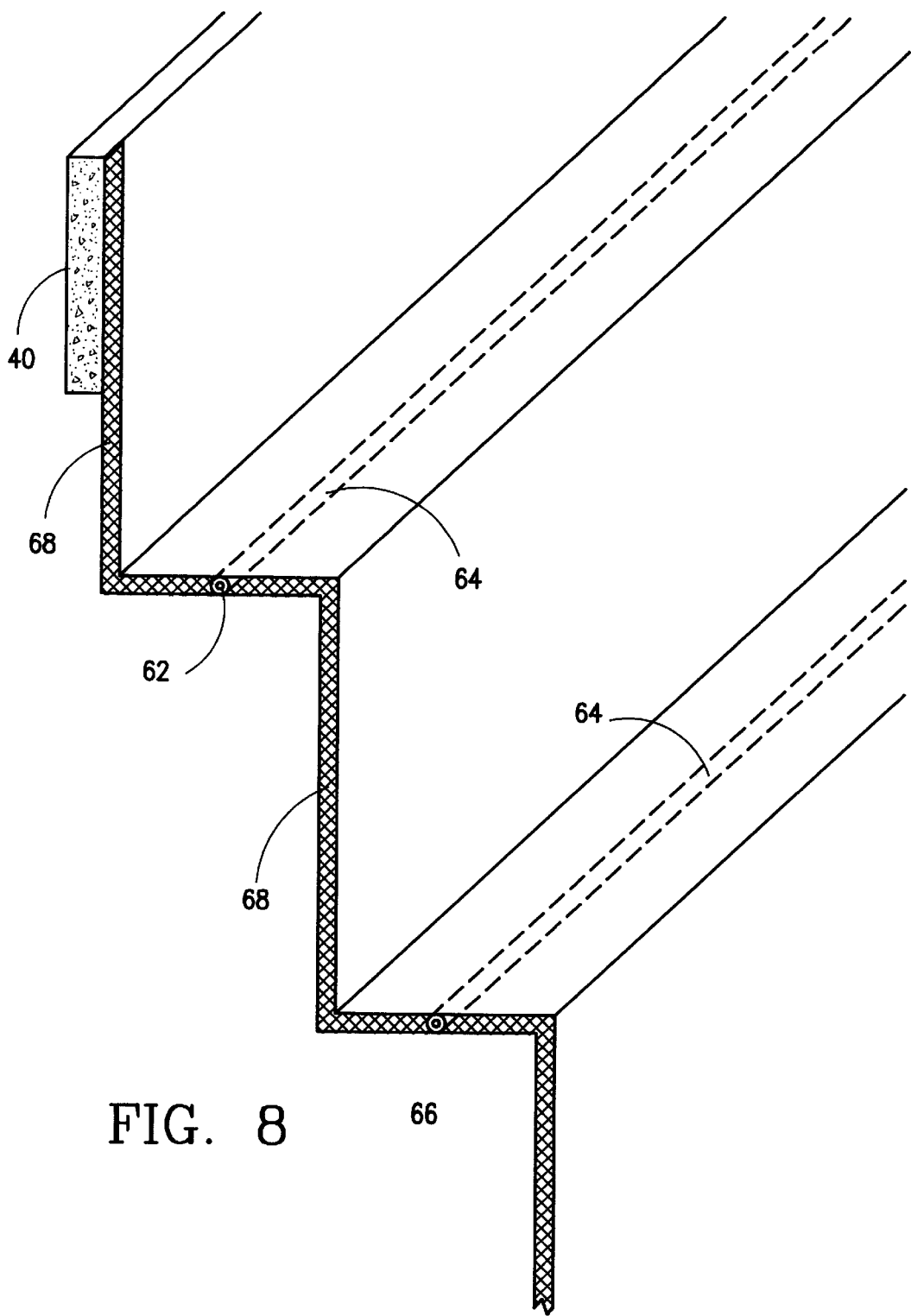
FIG. 8 is an exploded perspective view of the stepped side walls of the clay excavation showing the liner, the media, and the phantom conduit paths.

FIG. 8 is an exploded perspective view of the stepped sides of the excavation, and illustrates the placement of the step within clay 66. Conduits 62 are shown in their phantom conduit paths 64. Assuming that we are using a dual-liner system, media 68 is placed within or between the liners so that any water which breaks into the cell from underneath can travel to any of our sensors. This media system is known in the art to the liner industry, and may include grids, granulated materials, or any other highly porous media. Any other liner systems which will function in the necessary capacity in the furtherance of my invention is contemplated by this invention, and the limited recitation of the types of liner systems which are mentioned here shall not limit the scope of my invention, but rather gives an example of one which will work.

Figure 9:
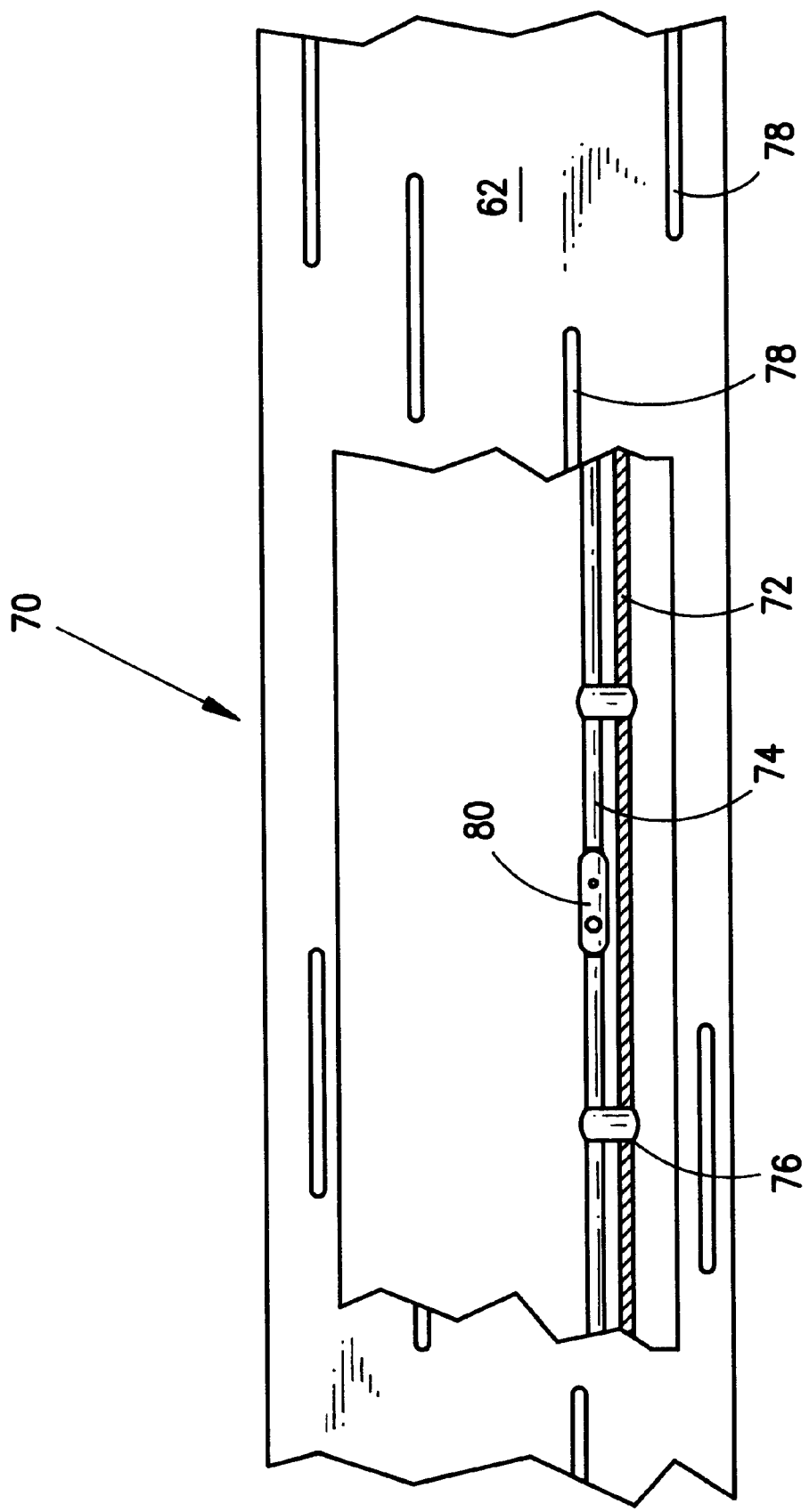
FIG. 9 is a cut away side view of the leak monitoring system.

Referring now to FIG. 9, the sensor or leak monitoring module is generally denoted by numeral 70. In the preferred embodiment of my invention, conduit 62 may include perforations 78 such that any water in the vicinity which has leaked into the bottom of the containment cell will enter into the conduit via the perforation 78. Contained within the conduit is a messenger cable 72, a control cable 74, which may be a photosensitive fiberoptic or other electronic device. Alternatively, a fully sealed vacuum tube system may be employed, using pneumatics for detection. Support clamps 76 attach sensor module 80, whether it be sensing gas, heat, moisture, water, or any other indicator that a leak has erupted. Although this is the leak monitoring system which is envisioned for the present invention, there are many other forms of leak detection modules that may be implemented for the present invention besides electronic, pneumatic and fiber optic systems.

Figure 10:
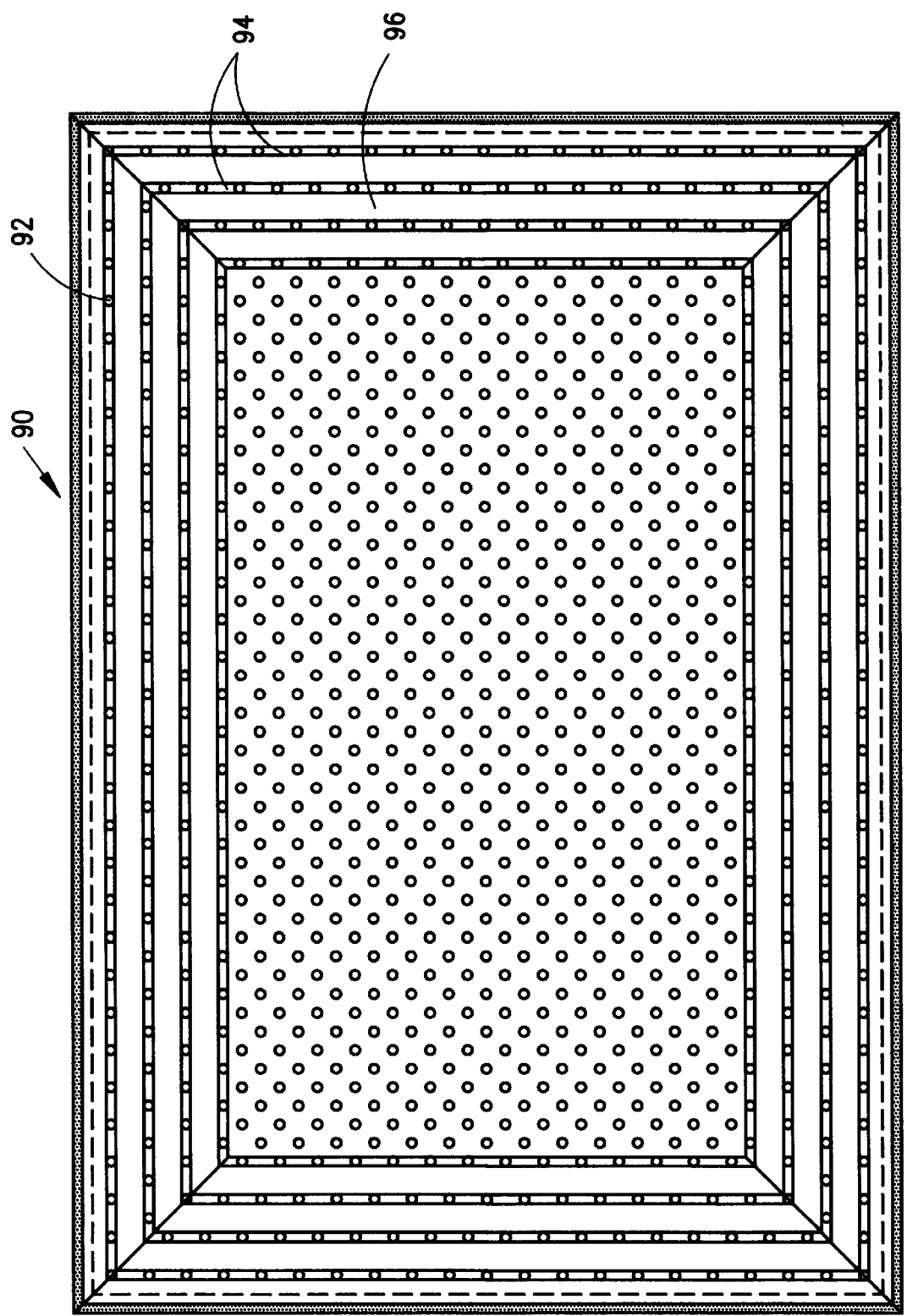
FIG. 10 is a top plan view illustrating the location of the monitoring centers.

FIG. 10 is a top plan view illustrating the location of the sensor grid, generally denoted by numeral 90. Individual sensors 92 are located within conduits 94 and are situated on steps 96 within the excavation. The number and location of the each of the individual sensors 92 will depend upon the site excavation, the porosity of the clay beds, and the sensitivity of the sensors themselves. In the preferred embodiment of the present invention, the sensors are available from Keyence Corporation of Woodcliff Lake, N.J.; Hy-Cal Engineering of El Monte, Calif.; or Madison Company of Branford, Conn. These sensors are all designed to pick up minuscule detections of any one or more of gas, water, heat, or other indicators of a clay bed eruption.

Figure 11:
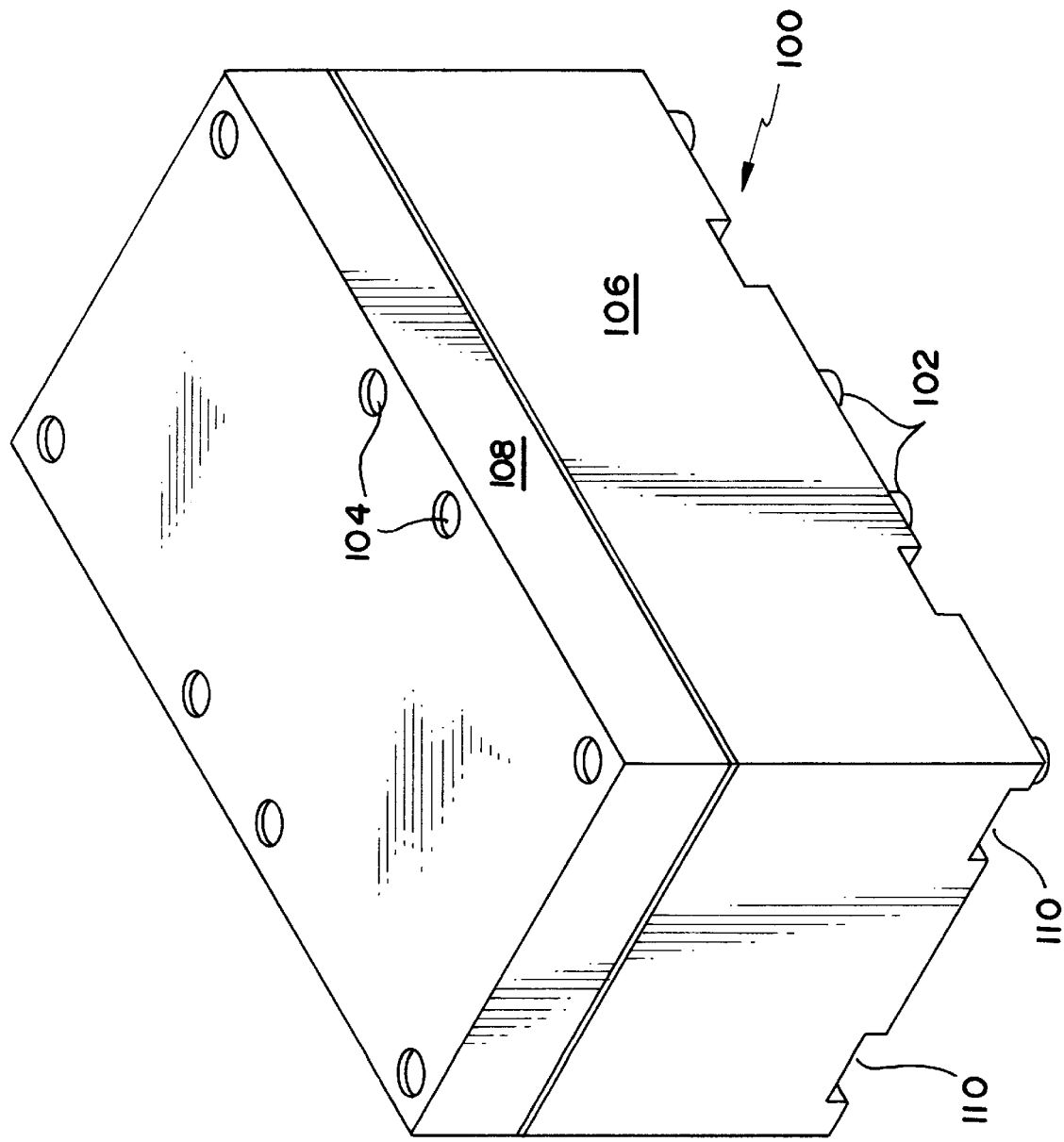
FIG. 11 is a perspective view of a preferred embodiment of the containers which may be used in accordance with my invention.

FIG. 11 shows a preferred container as generally denoted by numeral loo which includes locators 102 and receptors 104 for easy stacking of the containers. The container bottom 106 has a container top 108. In the preferred embodiment, there are forklift tine recesses 110 which enable easy maneuvering of the containers by forklifts, preferably electric. The forklifts run around on the floor of the clay excavation and stack the containers 100 as further shown in previous figures.

Within the containers as shown in FIG. 11, the processed waste is placed within the containers. Preferably, the waste has been dried, shredded and compacted. It is also foreseen that bar code indicators may be placed on the side of the container for easy location and inventory control. Further more, if a leak is detected by the leak monitoring system, it will be easy to remove the containers 100, which will permit the leak to be repaired, and then the containers can be replaced on top of the repaired leak.

In fact, the waste storage containment cell system is preferably an entirely modular system, whereby all parts, i.e. the containers, the conduit modules, the sensors, and liners can be replaced and/or repaired as needed, as well as the air structure itself which can be dismantled and reassembled over another cell site.

Therefore, in accordance with my invention as described herein above, I have provided an essentially leak proof, water tight, which is also hopefully odor free, waste storage containment cell for use in large scale operations for storing, in an environmentally friendly manner, landfill waste, construction waste, and remediated environmentally dangerous sites. I believe that my system will provide an environmentally safe means for dealing with waste that is generated by the consumer public, which also provides a way for finally and safely containing, in a totally controlled storage environment, the contents of leaking landfill sites which need to be remediated.

As many of the landfill sites that have been created over the last 50 or 60 years are leaking into our waterways, my system would provide relief from that leakage and would provide a storage containment for those materials that were placed into the leaking landfill site in such a manner that these unremediated detrimental effects would be alleviated. Furthermore, we will be providing a safe means for disposing and/or storing any of our future waste requirements.

What is claimed is:

1. A waste storage containment cell, comprising:

a bottom surface with stepped sides;

a liner with stepped sides complementary to and atop the step-sided bottom surface;

a leak monitoring device for detecting leaks in the liner;

individual containers for storing waste, said containers being adapted for being stacked on the step-sided bottom surface in an orderly fashion;

a cover over the waste storage containment cell and the individual containers, adapted for securely covering the step-sided bottom surface, such that rain and the outer elements are substantially prevented from entering the cell.

2. The cell of claim 1, wherein the step-sided bottom surface includes a clay bed excavation with stepped sides.

3. The cell of claim 1, wherein the step-sided bottom surface is an excavation having a substantially inverted pyramid configuration.

4. The cell of claim 1, wherein the step-sided liner is a double layer liner with media located therebetween.

5. The cell of claim 4, wherein the leak monitoring device is located within the double layer liner.

6. The cell of claim 1, wherein the leak monitoring device includes an electronic detector.

7. The cell of claim 1, wherein the leak monitoring device includes a pneumatic vacuum leak detector.

8. The cell of claim 1, wherein the leak monitoring device includes a fiber optic leak detection device.

9. The cell of claim 1, wherein the individual containers are made of materials suitable for their contents.

10. The cell of claim 1, wherein the cover includes an air structure, especially during the filling period of the cell.

11. The cell of claim 1, wherein the cover includes a cap liner, especially after the cell is filled.

12. The cell of claim 11, wherein the cap liner is a double liner having a leak detection means within said double liner.

13. A waste storage containment cell, comprising:

an excavated bottom surface;

a multiple layer liner with media located therebetween placed atop the excavated bottom surface, said media being suitable for collection of liquid;

a leak monitoring device grid with interchangeable and maintainable uniformly spaced leak detectors located within the multiple layer liner media and said grid of detectors being uniformly situated across the entire excavated bottom surface, said detectors being adapted for detecting leaks in the liner anywhere within the cell to monitor ground water or other liquid penetrating upward through the liner;

a cover over the lined excavation for securely covering the bottom surface, such that rain and the outer elements are substantially prevented from entering the cell and creating contamination by combining with the contents of the cell.

14. The cell of claim 13, wherein the cover includes an air structure.

15. The cell of claim 13, wherein the cover includes a cap liner.

* * * * *